Figure 1:
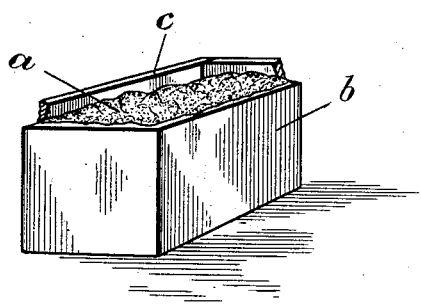

No. 759,373. PATENTED MAY 10, 1904.
C. H. HUTCHINGS.
MOLD FOR THE MANUFACTURE OF ARTIFICIAL STONE.
APPLICATION FILED FEB. 10, 1903.
NO MODEL.

Witnesses
Inventor

No. 759,373. Patented May 10, 1904.

UNITED STATES PATENT OFFICE.

CHARLES H. HUTCHINGS, OF TORONTO, CANADA, ASSIGNOR OF TWO-THIRDS TO PHILIP W. STANHOPE, OF TORONTO, CANADA.

MOLD FOR THE MANUFACTURE OF ARTIFICIAL STONE.

SPECIFICATION forming part of Letters Patent No. 759,373, dated May 10, 1904.

Application filed February 10, 1903. Serial No. 142,810. (No model.)

*To all whom it may concern:*

Be it known that I, CHARLES H. HUTCHINGS, of the city of Toronto, in the county of York and Province of Ontario, Canada, have invented certain new and useful Improvements in Molds for the Manufacture of Artificial Stone, of which the following is a full, clear, and exact description.

This invention relates to the manufacture of artificial stone having the appearance of cut natural stone, such artificial stone being made from a mixture of sand and cement or cement and other silicious materials—such as granulated slag, tailings, &c.—combined in such proportions as to form a homogeneous mass capable of resisting great pressure and withstanding the deleterious effects of climatic and atmospheric action; and it relates more particularly to the construction of the mold in which this mixture is cast, such mold consisting of a drag and a cope or matrix made of a metal composition capable of receiving a sharp imprint of a pattern and impervious to the corrosive action of the cement and sand and the metallic and mineral elements contained therein.

In carrying out the invention I produce the cope or matrix for the mold by heating the natural stone to approximately 212° Fahrenheit and pouring over it a molten metal composition consisting of antimony, zinc, and lead in the ratio of twenty-five per cent. antimony, twenty-five per cent. zinc, and fifty per cent. lead, melted and thoroughly mixed together in a suitable crucible, so as to readily flow over the heated stone used as the pattern and receive a perfect cast or imprint thereof, such stone and metal composition being permitted to gradually cool until the metal composition has set and hardened. By heating the stone the sudden chilling of the metal when coming into contact with it is prevented, and a sharp impression of the facets of the stone is made in the matrix, so that such facets can be clearly imprinted or reproduced on the artificial stone during the process of its manufacture. When the cope or matrix of the mold has been obtained, it is fitted to the drag by any suitable means, and the mixture of sand and cement, or cement and other silicious material, is placed in the mold in a substantially green state and subjected to mechanical pressure or tamping action to solidify the mixture and cause the particles of cement and sand to adhere to each other, the pressure or tamping being continued until the contents of the mold have been formed into a substantially homogeneous mass having a density or solidity equal to natural stone. When the molding of the artificial stone has been completed, it is removed from the mold and hydrated to bind together the atoms of sand and cement, the hydration of the artificial stone being repeated at suitable intervals until the cement has set and become thoroughly hardened or indurated.

Figure 2:
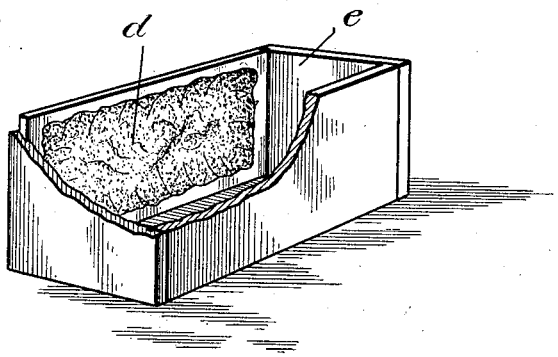

In the drawings, Figure 1 is a perspective view of the natural stone, showing the method of producing the matrix. Fig. 2 is a perspective view of the mold for making the artificial stone.

Like letters of reference refer to like parts throughout the specification and drawings.

In making the matrix the natural stone $b$ is heated to approximately 212° Fahrenheit, and a shallow wall or open frame is placed around the edges of the cut face $a$, the top of the shallow wall $c$ or frame projecting slightly above the highest point of the cut face. The molten metal, consisting of a mixture of antimony, zinc, and lead in the aforesaid proportions, is then poured over the cut face $a$ to completely cover the same, the walls $c$ retaining the metal thereon. The stone and metal are then allowed to gradually cool, and when the metal has set and hardened it is removed and used as the cope or matrix $d$ of the mold, the mold box or drag $e$ of which is connected to the cope or matrix by any suitable means. When the parts of the mold have been assembled, the mixture of cement and sand is placed therein and pressed or tamped to solidify the mixture and press it into the matrix $d$ to receive the imprint of the facet of the natural stone. The mixture of lead, antimony, and zinc being non-corrosive and non-adhesive prevents the adhesion of the atoms of cement and sand thereto, so that when the artificial stone has been molded and is being removed from the mold there will be no tendency on the part of the mold to destroy the sharp and clearly-defined facets produced by the matrix in imitation of the cut face or faces of the natural stone. The drag $e$ of the mold may be made of the same metal composition as the matrix $d$, which would be necessary in the manufacture of artificial stone having more than one ornamental or cut face; but for manufacturing artificial stone with one ornamental or cut face and the remaining faces smooth I find that a drag made of wood will fully answer the purpose and meet all the requirements as regards non-corrosion and non-adhesion. The matrix when made in this way will not only receive a sharp and clearly-defined imprint of the pattern, but will also retain it for a considerable time.

Having thus fully described my invention, what I claim as new, and desire to secure by Letters Patent, is—

1. The herein-described mold for use in the manufacture of blocks of artificial stone having an ornamental face from a corrosive mixture, comprising a mold-box, and an inflexible matrix therefor containing the pattern for the ornamental face, such matrix being made of a cast metallic composition capable of receiving a sharp imprint of the pattern and impervious to the corrosive and adhesive action of the mixture.

2. The herein-described mold for use in the manufacture of artificial stone from a corrosive mixture, comprising a mold-box and an inflexible matrix therefor containing the pattern for the ornamental face, such matrix being made of a cast-metal composition containing lead and zinc, and impervious to the corrosive and adhesive action of the mixture.

3. The hereinbefore-described mold for use in the manufacture of blocks of artificial stone, having an ornamental face, such mold comprising a mold-box and a matrix containing the pattern for the ornamental face, the matrix being made of a non-corrosive and non-adhesive metallic composition consisting of antimony, zinc, and lead; substantially as described.

4. The hereinbefore-described mold for use in the manufacture of blocks of artificial stone, having an ornamental face, such mold comprising a mold-box and a matrix containing the pattern for the ornamental face, the matrix being made of a non-corrosive and non-adhesive metallic composition, consisting of antimony, zinc and lead, in the proportions of twenty-five per cent. antimony, twenty-five per cent. zinc, and fifty per cent. lead; substantially as described.

Toronto, January 14, 1903.

CHARLES H. HUTCHINGS.

In presence of—
C. H. RICHES,
F. B. JARMAN.